M. J. DAVIS.
HEADLIGHT.
APPLICATION FILED MAR. 26, 1920.

1,369,967.

Patented Mar. 1, 1921.
2 SHEETS—SHEET 1.

Witness

Inventor
M. J. Davis.
By C. A. Snow & Co.
Attorneys

M. J. DAVIS.
HEADLIGHT.
APPLICATION FILED MAR. 26, 1920.
1,369,967
Patented Mar. 1, 1921.
2 SHEETS—SHEET 2.
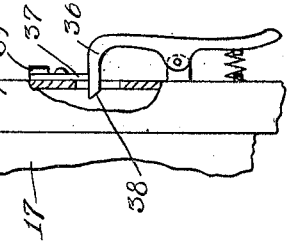
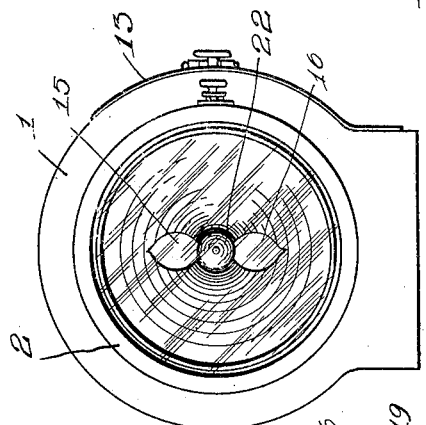
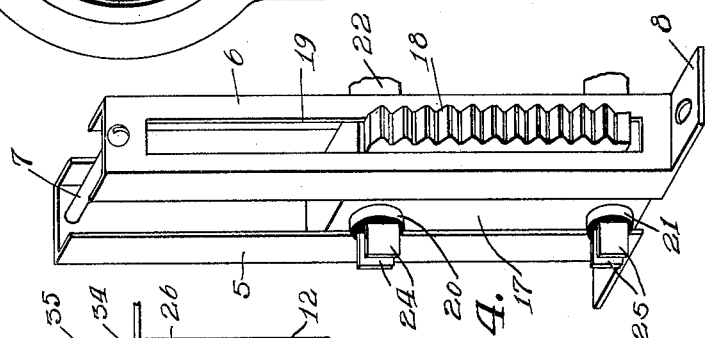
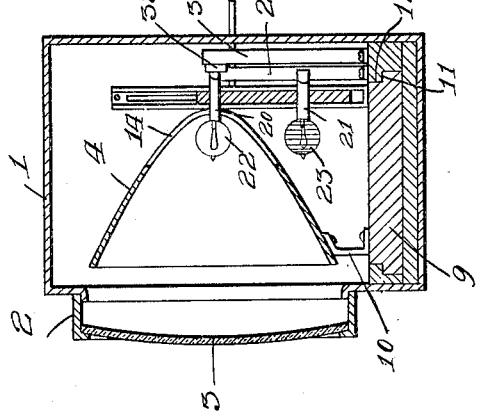
Inventor
M. J. Davis.
Witness
By C. A. Snow & Co.
Attorneys

UNITED STATES PATENT OFFICE.

MOSES J. DAVIS, OF PUEBLO, COLORADO.

HEADLIGHT.

1,369,967.   Specification of Letters Patent.   Patented Mar. 1, 1921.

Application filed March 26, 1920. Serial No. 369,035.

*To all whom it may concern:*

Be it known that I, MOSES J. DAVIS, a citizen of the United States, residing at Pueblo, in the county of Pueblo and State of Colorado, have invented a new and useful Headlight, of which the following is a specification.

This invention relates to headlights especially designed for use in connection with locomotives although it can also be used to advantage on other types of vehicles, boats and the like.

One of the objects of the invention is to provide a headlight having red and white lamps either of which can be brought to proper position at the center of the reflector at the will of the user.

It is a fact well known to railroad men that many accidents are caused when trains are heading in sidings because often the train does not clear the main line as soon as anticipated because of unforeseen difficulties and the blinding headlights make it difficult for the engineer of an approaching train to distinguish the small red lantern held by the brakeman.

One of the objects of the present invention is to provide means under the control of the engineer by means of which the headlight can be adjusted quickly to throw a red light instead of the usual white light so as thus to constitute a danger signal for the purpose of flagging an approaching train until after the train which is being switched has fully entered the siding after which the headlight can be turned off as indicating that the main line is clear.

A further object is to provide means whereby the lamp carrying portion of the headlight can be readily removed from and placed in position when repairs are to be made.

Another object is to provide a device of this character which can be combined readily with lamp housings and reflectors already in use.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Fig. 2 is a vertical longitudinal section through the headlight.

Fig. 3 is a front elevation.

Fig. 4 is a perspective view of the lamp slide and its guide.

Fig. 6 is a view partly in elevation and partly in section of one of the guide standards and showing the catch in engagement with the slide, a portion of the slide being shown.

Figure 1:
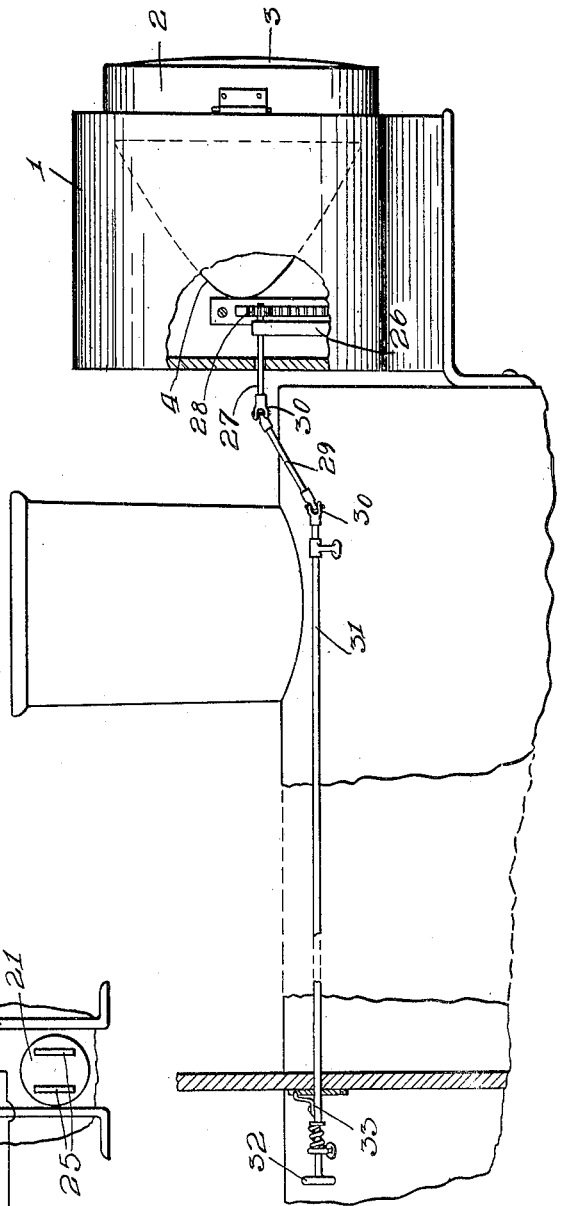
Figure 1 is a view partly in side elevation and partly in section of a portion of a locomotive having the present improvements combined therewith.
Figure 5:
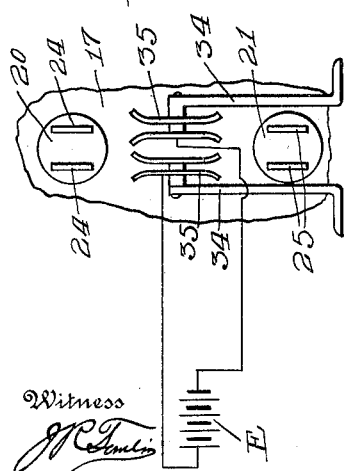
Fig. 5 is a rear elevation of a portion of the slide and showing the upper and lower contacts and also showing the stationary contacts to be engaged thereby.

Referring to the figures by characters of reference 1 designates a lamp housing which can be of the usual construction, provided at the front thereof with a hinge frame 2 for carrying a lens 3 while mounted within the housing and back of the lens is the usual reflector 4. This reflector is soldered or otherwise secured at the back to each of two opposed standards 5 and 6 which are channeled to constitute guides, the said standards being connected together at their upper ends by a rod 7 or the like and being provided, at their lower ends, with feet 8 which are fastened to a supporting block 9. A bracket 10 is mounted on this block and is connected to the front portion of the reflector at the bottom thereof so as to constitute an additional support. The block 9 is slidable transversely into the housing and has its edges rabbeted as indicated at 11 so as to be overhung and retained by a guide rib 12 provided within the housing. A side door 13 is carried by the housing and when this door is opened the block 9 can be inserted laterally into the housing so as to position the reflector 4 directly back of the lens 3. Any suitable means may be provided for fastening the block 9 against movement after it has once been inserted into the housing.

The reflector 4 is provided at the center of the back thereof with a vertical slot 14 which constitutes a connection between two elliptical openings 15 and 16 located in the reflector and above and below the center thereof. These openings are so shaped and proportioned as to permit a lamp to be moved vertically through the back portion of the reflector.

Mounted to move within the guide standards 5 and 6 is a slide 17 one side of which is provided with a rack 18 which projects through a slot 19 formed in the standard 6. In the upper and lower portions of the slide 17 are plugs 20 and 21 of suitable insulating material and carried by the forward end of the upper plug 20 is a white incandescent lamp 22 while a red incandescent lamp 23 is carried by the forward end of the lower plug 21. Extending from the rear end of the plug 20 are laterally spaced contact strips 24 electrically connected to the lamp 22 while similar laterally spaced contact strips 25 extend from the rear end of the lower plug 21 and are electrically connected to the lamp 23.

Mounted on the bottom of the lamp housing and back of the block 9 is a supporting bracket 26 in which is journaled a shaft 27 having a gear 28 at one end thereof adapted to mesh with the rack 18 when the block 9 is properly positioned within the lamp housing. This shaft 27 may be connected by a shaft section 29 and universal joints 30 to a long operating rod 31 extending into the cab of the engine and provided with a grip or handle 32 whereby the rod can be rotated readily for the purpose of actuating the gear 28. A suitable indicator 33 may be mounted in the cab for showing the position of the slide 17 relative to the reflector. Under some conditions the universal joints may be dispensed with and a continuous rod may be extended from the gear 28 to the engine cab. This modification is so obvious that no detailed description or illustration thereof is considered necessary.

A bracket 34 is arranged in the rear portion of the housing and back of the block 9 and carries laterally spaced contacts 35 in the paths of the respective contacts 24 and 25.

Under normal conditions the white lamp 22 is located in front of the slot 14 at the center of the reflector 4, the slide 17 is in its lowermost position, and the red lamp 23 is located below the reflector, as shown in Fig. 2. Should it be desired to display a warning or red signal the operator rotates the rod 31 so as to cause gear 28 to move the rack 18 and slide 17 upwardly. This will cause the white lamp 22 to move upwardly through the upper opening 15 to position above the rear portion of the reflector while the red lamp 23 will move through the opening 16 and into position in front of the middle portion of the reflector. During this movement of the slide 17 the contact strips 24 will move away from the contacts 35 while the contact strips 25 will move up into engagement with the contacts 35. As the contacts 35 are electrically connected with a source of electricity, E, it will be apparent that as soon as the red lamp is brought to the position described, the electric current will be directed thereto and a red light will be projected through the lens 3. By moving the lamps one-half the distance from one extreme position to the other the two lamps will be brought partly above and below the reflector respectively, this being a neutral position where neither a white light nor a red light will be projected by the reflector, both pairs of contacts 24 and 25 being removed from the contacts 35. While the lamps are in their neutral positions the side door 13 can be opened and the block 9 withdrawn laterally from the housing, thus bringing the reflector 4, the guides 5 and 6 and the parts carried by the guides out of the housing where they can be repaired, cleaned, etc. While the lamps are in their neutral positions, a spring pressed catch 36 mounted on the standard 5, will project through an opening 37 in said standard and engage a notch 38 in the slide 17 so as to prevent the slide from moving downwardly out of position. When the catch is not to be used, as where the slide is to be moved upwardly and downwardly from the cab, a closure 39 which is pivotally or otherwise connected to the standard 5, is moved downwardly so as to extend across the opening 37 and prevent the catch 36 from engaging the slide.

It is to be understood that where a high voltage is used the contacts 24 can be spread apart the necessary distance and can be properly insulated.

What is claimed is:

1. In a headlight the combination with a housing and a reflector in the housing having an opening in the back portion thereof, of a guide within the housing and back of the reflector, a slide mounted for right line movement within the guide, spaced lamps thereon, contacts electrically connected to the lamps and movable with the slide, a rack upon the slide, a gear engaging the rack for shifting the slide, to position either of the lamps within the opening in the back of the reflector, and contacts adjacent the reflector for engagement by the contact of the lamp seated within the reflector.

2. In a headlight the combination with a housing and a reflector therein having an opening in the back portion thereof, of a guide within the housing and close to the back of the reflector, a slide mounted for right line movement within the guide, spaced lamps carried by the slide, contacts extending from the slide and electrically connected to the respective lamps, a rack upon the slide, a gear for engaging the rack, means for rotating the gear to shift the slide, stationary contacts close to the slide for engagement by the contact of the lamp brought to position within the opening in the reflector, a source of electrical energy communicating with the stationary contacts, a catch upon the guide for engagement with the slide to hold the slide in intermediate position, and means upon the guide for holding the catch out of active position.

3. The combination with a lamp housing and stationary contacts therein electrically connected to a source of electrical energy, of a structure movable laterally into and out of the housing and comprising a block, a reflector thereon having an opening at the center thereof, a guide, a slide mounted on the guide, spaced lamps carried by the slide, and contacts electrically connected to the respective lamps; and means in the housing and adapted to be engaged by the slide when inserted into the housing, for actuating the slide to electrically connect the contacts of either lamp to the stationary contacts and to position either lamp, when electrically connected, within the middle portion of the reflector.

4. The combination with a lamp housing, an actuating gear therein, and a stationary contact within the housing and connected to a source of electrical energy, of a structure insertible laterally into and removable from the housing, said structure including a block, a reflector thereon having an opening at the back thereof, a guide, a slide movable on the guide, spaced lamps carried by the slide, and contacts electrically connected to each lamp, and means on the slide for engagement with the actuating means when the block is inserted into the housing, said actuating means operating to shift the slide and position either of the lamps within the back portion of the reflector and in electrical communication with the stationary contact.

In testimony that I claim the foregoing as my own, I have hereto affixed my signature in the presence of two witnesses.

MOSES J. DAVIS.

Witnesses:
C. BOXWELL,
E. L. ELLER.